No. 712,775. Patented Nov. 4, 1902.
R. M. DIXON.
HOSE COUPLING.
(Application filed June 12, 1902.)
(No Model.)
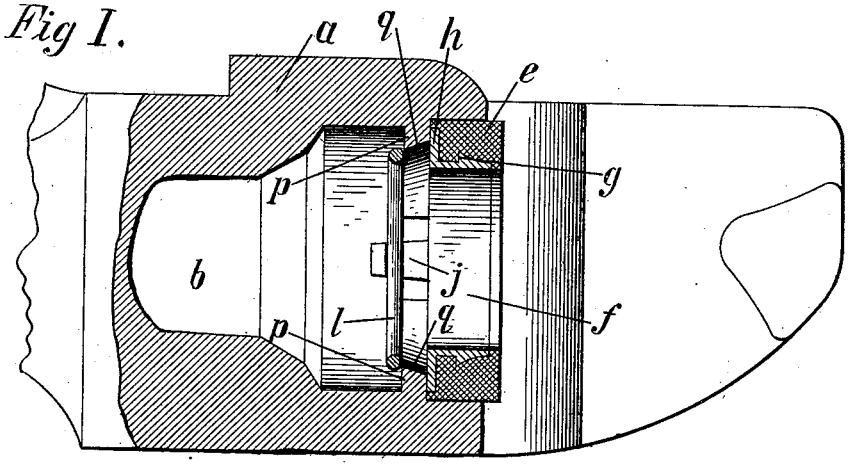
Fig. I.
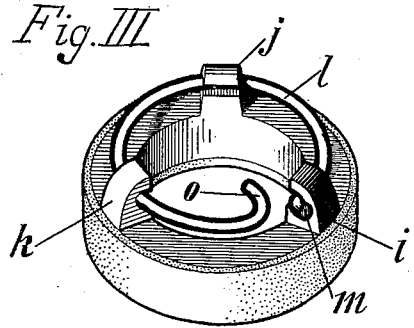
Fig. III.
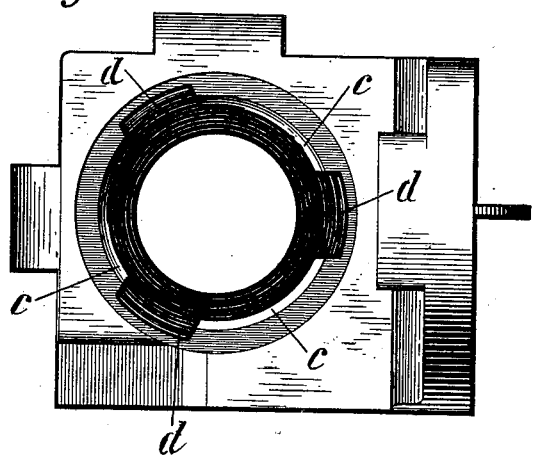
Fig. II.
WITNESSES:
INVENTOR
BY
ATTORNEYS.

UNITED STATES PATENT OFFICE.

ROBERT M. DIXON, OF EAST ORANGE, NEW JERSEY.

HOSE-COUPLING.

SPECIFICATION forming part of Letters Patent No. 712,775, dated November 4, 1902.

Application filed June 12, 1902. Serial No. 111,308. (No model.)

*To all whom it may concern:*

Be it known that I, ROBERT M. DIXON, a citizen of the United States, and a resident of East Orange, Essex county, New Jersey, have invented certain new and useful Improvements in Hose-Couplers, of which the following is a specification.

My invention relates to hose-couplers; and it consists of the novel features hereinafter set forth and claimed.

In the accompanying drawings I have shown one member of a hose-coupling in which my invention is embodied, it being understood that this construction is shown by way of illustration merely and that my invention is not confined to the construction shown.

Figure I is a transverse section through the coupling. Fig. II is an end view thereof, and Fig. III is an isometric view of the removable sleeve or bushing.

In the drawings, $a$ indicates the coupler-head, which is or may be provided with any suitable means for engaging a companion coupler, so as to afford a passage for the uninterrupted flow of fluids. This head is recessed interiorly, as at $b$, and is provided with an internal interrupted shoulder composed of lugs $c$ and the intervening grooves $d$. A removable bushing is provided, shown in the present instance as comprising a gasket $e$, of fibrous or other material, mounted or molded upon a metallic collar $f$, having an engaging flange $g$ and an outwardly-turned flange $h$, carrying lugs $i\,j\,k$, which are adapted to enter the grooves or recesses between the lugs $c$ of the interrupted annular shoulder.

The lugs $i\,j\,k$ are transversely slotted for the reception of a locking-spring $l$, shown in the present instance as a wire having a bent end $m$, adapted to bear against the side of the lug $i$, and a hooked or handled end $o$, by which the spring may be slightly collapsed.

By referring to Fig. I it will be observed that when the removable bushing is in place the locking-spring will rest against the rear faces $p$ of the lugs $c$ and will lock the bushing firmly in place in the coupling. Removal of the bushing from the coupling may be accomplished by engaging the hook or handle $o$ and pulling the spring slightly to clear it of the faces $p$. When it is desired to reinsert the bushing, it is simply pressed back into place, the beveled faces $q$ of the lugs serving to collapse the spring until the said spring passes the said faces and is expanded outwardly by its own resiliency to lock the bushing in place.

Having described my invention, what I claim, and desire to secure by Letters Patent, is—

1. In combination, a coupler-head provided with internal lugs, a removable bushing provided with lugs, and a locking-spring carried by the lugs of the bushing and adapted to rest behind the lugs of the coupler-head to lock the bushing in place in the coupling.

2. In combination, a coupler-head provided with a shoulder, a lugged bushing and a locking-spring intervening between the lugs of the bushing and the lugged portion of the coupler-head.

R. M. DIXON.

Witnesses:
B. P. VAN PRAAG,
F. E. KESSINGER.